(12) United States Patent
Yamaguchi et al.

(10) Patent No.: US 7,033,705 B2
(45) Date of Patent: Apr. 25, 2006

(54) POLYMER ELECTROLYTE, RECHARGEABLE LITHIUM BATTERY AND METHOD OF PREPARING RECHARGEABLE LITHIUM BATTERY

(75) Inventors: Takitaro Yamaguchi, Yokohama (JP);
Ryuichi Shimizu, Yokohama (JP);
Cheol-Soo Jung, Ohsan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 551 days.

(21) Appl. No.: 10/207,767

(22) Filed: Jul. 31, 2002

(65) Prior Publication Data

US 2003/0104283 A1   Jun. 5, 2003

(30) Foreign Application Priority Data

Oct. 30, 2001   (JP)   ............................. 2001-333444

(51) Int. Cl.
*H01M 10/40*   (2006.01)

(52) U.S. Cl. ...................................... 429/248; 429/247

(58) Field of Classification Search ................ 429/247, 429/249, 142, 145, 248, 250, 129
See application file for complete search history.

(56) References Cited

U.S. PATENT DOCUMENTS 6,511,774 B1 *   1/2003   Tsukuda et al. ............ 429/247

* cited by examiner

*Primary Examiner*—Michael Barr
*Assistant Examiner*—Monique Wills
(74) *Attorney, Agent, or Firm*—Stein, McEwen & Bui, LLP

(57) ABSTRACT

A polymer electrolyte includes an organic electrolyte solution and a composite fiber immersed with the organic electrolyte solution. The organic electrolyte includes lithium salts dissolved in a non-aqueous solvent. The composite fiber includes a fiber that is gelable, and a fiber that is ungelable by the non-aqueous solvent. The gelable fiber has at least two acidic groups and at least two gelable functional groups. The gelable fiber is cross-linked by a bivalent or multivalent basic cross-linking agent, thereby cross-linking the composite fiber.

27 Claims, 4 Drawing Sheets

POLYMER ELECTROLYTE, RECHARGEABLE LITHIUM BATTERY AND METHOD OF PREPARING RECHARGEABLE LITHIUM BATTERY

CROSS REFERENCE TO RELATED APPLICATION

This application is claims the benefit of Japanese patent application No. 2001-333444, filed in the Japanese Patent Office on Oct. 30, 2001, the disclosure of which is incorporated hereinto by reference.

BACKGROUND OF THE INVENTION

1. Field of the Invention

The present invention relates to a polymer electrolyte, a rechargeable lithium battery including the polymer electrolyte, and a method of preparing the rechargeable lithium battery.

2. Description of the Related Art

The development of miniaturized portable electronics has created the need for a lighter and smaller rechargeable lithium battery with varying shapes.

Rechargeable lithium batteries can be classified into two categories, namely a lithium ion battery or a lithium ion polymer battery. The lithium ion polymer battery uses a solid electrolyte such as a polymer, unlike the lithium ion battery that uses a liquid electrolyte. The lithium ion polymer battery, therefore is lighter and has a smaller volume than the lithium ion battery. Furthermore, the lithium ion polymer battery is capable of being fabricated into various shapes.

Rechargeable lithium batteries with the polymer electrolyte can be further classified into a physical-gel battery and a chemical-gel battery.

The physical-gel battery may be manufactured in the following operations: an organic electrolyte solution is added to a polymer, the resulting mixture is heated to dissolve the polymer to create a paste, the paste is coated on a positive electrode and a negative electrode, the coated electrodes are assembled together with a separator to prepare an electrode element, the electrode element is inserted into a battery case, and the electrode element is then sealed within the battery case.

The polymer used in the physical-gel battery is usually a material that swells in an organic electrolyte solution at room temperature and dissolves at temperature ranges of 80 to 100° C. The swelling property affects gelation.

In the manufacturing process of the chemical-gel battery, a positive electrode, a separator, and a negative electrode are all assembled to produce an electrode element. The electrode element is then inserted into a battery case. An organic electrolyte, a vinyl monomer, and a polymerization initiator are injected into the battery case. Upon injection of the organic electrolyte, the vinyl monomer, and the polymerization initiator, the polymerization initiator reacts with the monomer to polymerize in the battery case, thereby fabricating the chemical-gel polymer battery.

The monomer used in the chemical-gel battery manufacturing process is one that readily swells in the organic electrolyte solution at room temperature.

The physical-gel battery and the chemical-gel battery have ionic conductivities in a range of about 2 mS/cm and about 3 mS/cm, respectively.

Both the physical-gel battery and the chemical-gel battery have drawbacks. The physical-gel battery has a drawback in that the polymer dissolves in the organic electrolyte solution when the temperature increases, and the resulting liquid leaks. One of the drawbacks of the chemical-gel battery includes the deterioration of charge due to incomplete polymerization between the vinyl monomer and the polymerization initiator. Another drawback of the chemical-gel battery is the reaction between the polymerization initiator and the vinyl monomer causing generation of gas. Yet another drawback of the chemical-gel battery is that the monomer is usually insufficiently polymerized to prepare a polymer electrolyte.

SUMMARY OF THE INVENTION

It is an object of the present invention to provide a polymer electrolyte that has good heat-resistance and does not dissolve in an organic electrolyte solution at room temperature or at high temperatures.

It is another object to provide a rechargeable lithium battery including the polymer electrolyte.

It is still another object to provide a method of preparing the rechargeable lithium battery with the polymer electrolyte.

Additional objects and advantages of the invention will be set forth in part in the description which follows and, in part, will be obvious from the description, or may be learned by practice of the invention.

These and other objects may be achieved by a polymer electrolyte of an embodiment of the present invention that includes an organic electrolyte solution and a composite fiber immersed with the organic electrolyte solution.

One aspect of the present invention is an organic electrolyte solution includes a lithium salt dissolved in a non-aqueous solvent.

According to another embodiment of the present invention, the composite fiber includes a gelable fiber comprising at least two acidic groups and at least two gelable functional groups.

According to a further aspect of the present invention the composite fiber further includes an ungelable fiber.

According to a still further aspect of the present invention the gelable fiber is gelated by the non-aqueous solvent, and the ungelable fiber is not gelated by the non-aqueous solvent.

According to yet a further aspect of the present invention, the gelable fiber in the composite fiber is cross-linked by a bivalent or multivalent basic cross-linking agent, thus cross-linking the composite fiber, wherein the gelable fiber is gelated by the organic electrolyte solution.

According to a further embodiment, the gelable fiber may have at least two basic groups, wherein the cross-linking agent uses a bivalent or multivalent acidic cross-linking agent.

According to a still further embodiment of the present invention is a rechargeable lithium battery which comprises the polymer electrolyte, a positive electrode, and a negative electrode, wherein the positive and negative electrodes intercalate and deintercalate lithium ions.

According to a yet further embodiment of the present invention, a method of fabricating the rechargeable lithium battery which includes mixing of a gelable fiber with an ungelable fiber to prepare a composite fiber as a base polymer.

One aspect of the present invention is that a base polymer, a positive electrode and a negative electrode are inserted into a battery case followed by the addition of a gelation liquid that is prepared by mixing a bivalent or multivalent basic or acidic cross-linking agent with an organic electrolyte solution.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE EMBODIMENTS

Figure 1:
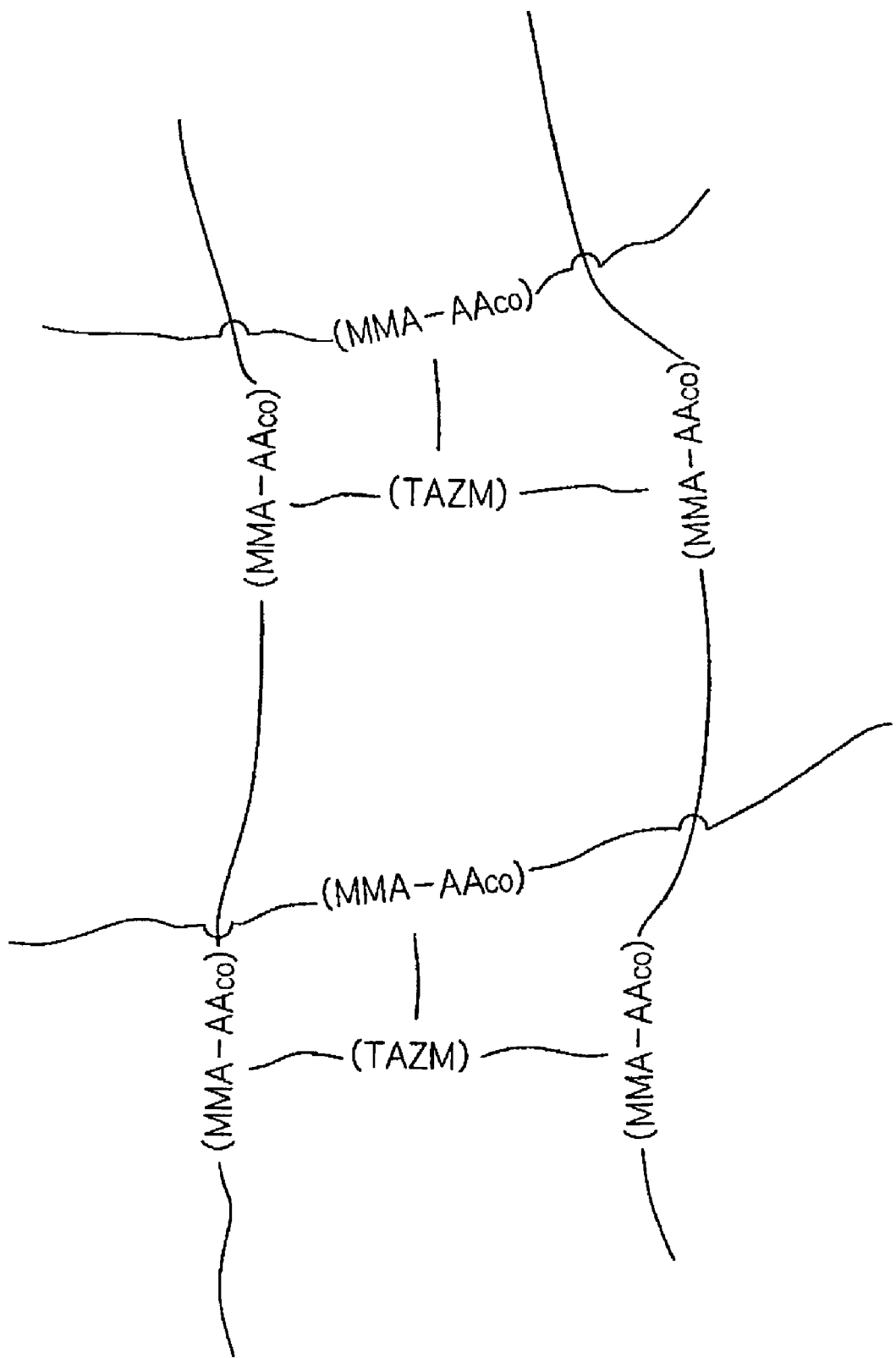
FIG. 1 is a schematic diagram showing a cross-linking structure of a polymer electrolyte according to an embodiment of the present invention.

Reference will now be made in detail to the present embodiments of the present invention, examples of which are illustrated in the accompanying drawings and described in specific Examples, wherein like reference numerals refer to the like elements throughout. The embodiments are described below in order to explain the present invention by referring to the figures.

A polymer electrolyte of the present invention according to one of the embodiments includes an organic electrolyte solution and a composite fiber immersed in the electrolyte solution, wherein the organic electrolyte solution includes a lithium salt dissolved in a non-aqueous solvent, and the composite fiber includes a gelable fiber and an ungelable fiber.

According to one aspect of the present invention the gelable fiber is a fiber that can be gelated by the non-aqueous solvent, and the ungelable fiber is a fiber that cannot be gelated by the non-aqueous solvent.

The gelable fiber in the composite fiber is gelated by the non-aqueous solvent. The gelable fiber in the composite fiber swells in the organic electrolyte solution affecting gelation, such that the degree of integration of the organic electrolyte solution into the composite fiber depends on the extent of swelling of the gelable fiber in the organic electrolyte solution.

In one of the embodiments of the present invention, the gelable fiber has at least two acidic groups, and at least two gelable functional groups. In another embodiment, the gelable fiber has at least two basic groups instead of the acidic groups. In one aspect of the present invention, the gelable fiber has acidic groups and is cross-linked by a bivalent or multivalent basic cross-lining agent. In a further aspect of the present invention, the gelable fiber has basic groups and is cross-linked by a bivalent or multivalent acidic cross-linking agent.

The acidic group or basic group cross-linked by the basic or acidic cross-linking agent helps to maintain the structure of the composite fiber so that it is difficult to separate the gelation portion from the composite fiber. Further, the cross-linking reaction depends on the redox reaction such that the reaction can be completed and a sufficient cross-linking structure can be generated.

The acidic group or the basic group in the gelable fiber in one aspect of the invention reacts with the basic or acidic cross-linking agent to form a rigid cross-linking structure, allowing no breakage at high temperatures. Such a rigid structure allows sufficient retention of the organic electrolyte solution, which results in a good heat-resistant polymer electrolyte.

The acidic group in the gelable fiber is selected from the group consisting of carboxylic acid group and a sulfonic acid group. Such acidic groups have a relatively high acidity and therefore form a considerably rigid structure.

The bivalent or multivalent basic cross-linking agent may be an aziridine ring-(ethyleneamine group)-included compound, an amino group-included compound, or a mixture thereof. According to an embodiment of the invention, the bivalent or multivalent basic cross-linking agent comprises the aziridine ring-included compound. In another embodiment, the basic cross-linking is a compound with at least two aziridine rings.

In one aspect of the present invention, the cross-linking agent with the aziridine ring reacts with the acidic group in the gelable fiber by an opening-reaction as well as a redox reaction. Therefore, the bond between the cross-liking agent with the aziridine ring and the gelable fiber is stronger than the bond between the cross-linking agent without the aziridine ring and the gelable fiber.

The cross-linking agent with the aziridine ring is coordinated by lithium to form a gel. The opened aziridine rings react with each other to polymerize the basic cross-linking agent. As a result, the obtained polymer electrolyte has a very complex cross-linked structure, which results in good organic electrolyte solution retention and good heat resistance.

In one aspect of the present invention, the basic group in the gelable fiber is selected from the group consisting of a pyridyl group and a dimethylamino group. Such basic groups have relatively high basicity and therefore form a considerably rigid structure. In this case, the cross-linking agent is an acidic cross-linking agent instead of the basic cross-linking agent.

The acidic cross-linking agent is a compound selected from the group consisting of the compounds represented by formula A, formula B, formula C, formula D, formula E, formula F, or a mixture thereof.

$$HOOC\text{—}C_{m2}H_{2m2}\text{—}COOH \quad (A)$$

$$HOOC\text{—}(CH_2O)_{m3}\text{—}COOH \quad (B)$$

$$HOOC\text{—}(C_2H_4O)_{m3}\text{—}COOH \quad (C)$$

$$HO_3S\text{—}C_{m4}H_{2m4}\text{—}SO_3H \quad (D)$$

$$HO_3S\text{—}(CH_2O)_{m5}\text{—}SO_3H \quad (E)$$

$$HO_3S\text{—}(C_2H_4O)_{m5}\text{—}SO_3H \quad (F)$$

(where $0 \leq m_2 \leq 50$, $1 \leq m_3 \leq 50$, $0 \leq m_4 \leq 50$, and $1 \leq m_5 \leq 50$)

The gelable functional group is selected from the group consisting of a cyano group and a methoxycarbonyl group according to an embodiment of the invention. Such functional groups have high solubility in the organic electrolyte solution, therefore having the capacity to completely gelate the gelable fiber.

In one embodiment of the present invention a rechargeable lithium battery of the present invention comprises a polymer electrolyte, a positive electrode and a negative electrode. The electrodes intercalate and deintercalate lithium ions, and the lithium battery includes a battery case. The polymer electrolyte does not affect the change of the polymer into a liquid at high temperatures, and has good stability and good cycle-life characteristics.

In an embodiment of the invention, a rechargeable lithium battery is manufactured in the following manner: a gelable fiber is mixed with an ungelable fiber to prepare a composite fiber as a base polymer, the gelable fiber has at least two acidic groups or two basic groups and at least two gelable functional groups, the base polymer is interposed between the positive electrode and the negative electrode to make an electrode element, the electrode element is inserted into a battery case, a gelation liquid is injected therein. After the injection of the gelation liquid in the battery case, the gelation of the base polymer occurs. However, it is understood that other method of manufacture can be used.

The method of manufacturing a rechargeable lithium battery in the manner described above presents numerous advantages including, but not limited to, allowing the cross-liking reaction of the base polymer to occur in the battery case. Therefore, the total procedure is simplified and productivity improves. Another advantage of the method of manufacturing a rechargeable lithium battery in the manner described above is that the procedure does not require a polymerization initiator. Therefore the problems associated with a product derived from the initiator, such as the deterioration of charge and discharge characteristics and the generation of gas, do not occur. A further advantage of the method of manufacturing a rechargeable lithium battery in the manner described above is that, since the electrolyte and the inner portions of the positive electrode and the negative electrode are gelated, the rechargeable lithium battery exhibits superior battery performance.

In one aspect of the present invention, the gelation liquid is prepared by mixing a bivalent or multivalent basic or acidic cross-linking agent with an organic electrolyte solution including lithium salts dissolved in a non-aqueous solvent.

After the gelation, in one aspect of the present invention, the battery case may be heated at 40 to 85° C. for 10 to 600 minutes depending on the copolymer ratio of the gelable fiber. The heat-treatment after the gelation causes the cross-linking of the polymer by the basic or acidic cross-linking agent to proceed to completion.

In one embodiment of the present invention, the polymer electrolyte comprises a composite fiber having acidic groups. The composite fiber further comprises a gelable fiber and an ungelable fiber, and a basic cross-linking agent. The composite fiber is immersed with an organic electrolyte solution.

The ungelable fiber is selected from the group consisting of polypropylene, polyethylene, polyethyleneterephthalate, polystyrene, nylon, cellulose, and a mixture thereof. The ungelable fiber is preferably selected from the group consisting of polypropylene and polyethylene. The selection of the ungelable fiber is not limited to compounds herein mentioned, and any materials which are not gelated or are difficult to gelate by the organic electrolyte solution, may be used for the ungelable fiber.

An example of an ungelable fiber is a polymer represented by formula 1:

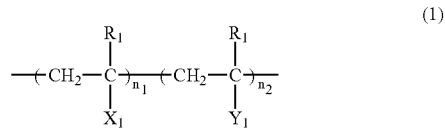

wherein
two R1 groups are the same or independently H or $CH_3$;
X1 is $COOCH_3$ or CN and is a gelable functional group;
$Y_1$ is COOH or $SO_3H$;
$n_1$ and $n_2$ are the degree of polymerization;
$n_1$ is 100 to 10,000; and
$n_2$ is 10 to 10,000, and is preferably 10 to 1,000.

If the degree of polymerization (values of $n_1$ and $n_2$) is less than the range prescribed above, the fluidity of the polymer electrolyte increases and the polymer electrolyte is not solidified. If, the degree of polymerization (values of $n_1$ and $n_2$) is more than the range prescribed above, the macro molecular weight polymer is not gelated by the organic electrolyte solution.

The polymer represented in formula 1 is a random polymer in which the repeating units with $n_1$ and $n_2$ respectively are randomly arranged in the polymer back bone.

In an embodiment of the invention, the basic cross-linking agent is selected from the group consisting of a bivalent, a multivalent base, an aziridine ring-included compound, an amino group-included compound, and a mixture thereof. According to an aspect of the invention, the basic cross-linking agent comprises aziridine ring-included compound, and preferably, at least two aziridine ring-included compounds.

An example of the basic cross-linking agent is the aziridine ring-included compound represented by formula 2 or formula 3.

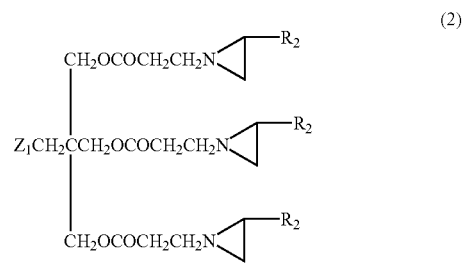

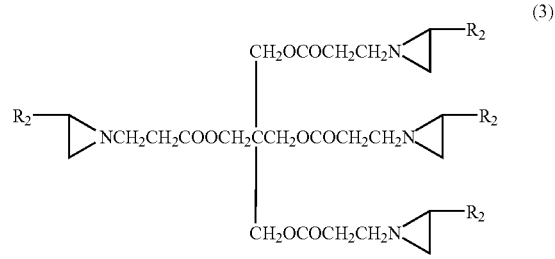

wherein the three $R_2$ groups are the same or independently H or $CH_3$, and the $Z_1$ group is H, $CH_3$ or OH.

Another example of the basic cross-linking agent is the aziridine ring-included compound represented by formula 4 or by formula 5, or trimethylolpropane-tris(2-methyl-(1-aziridinepropionate) or N,N-hexamethylene-1,6-bis(1-aziridinecarboxyamide). Preferably, these compounds are used together with the compound represented by formula 2 or formula 3.

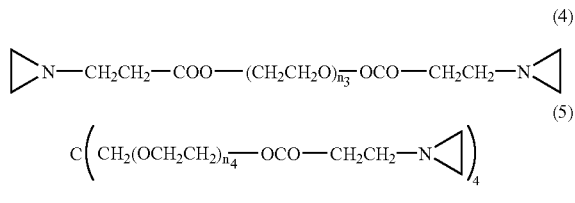

wherein
$n_3$ is 0 to 10, and
$n_4$ is 0 to 10.

In yet another aspect of the invention, the basic cross-linking agent is selected from the group consisting of trimethylolpropane-tri-β-aziridinylpropionate of formula 6 ($R_1$ is H and $Z_1$ is $CH_3$ in Formula 2 and hereinafter referred to as "TAZM"), a compound of formula 7 ($R_1$ and $Z_1$ are both $CH_3$ in formula 2 where H is substituted with $CH_3$ in TAZM and hereinafter referred to as "Me-TAZM"), tetramethylolmethane-tri-β-aziridinylpropionate of formula 8 ($R_1$ is H and $Z_1$ is OH in formula 2 and hereinafter referred to as "TAZO"), and a mixture thereof.

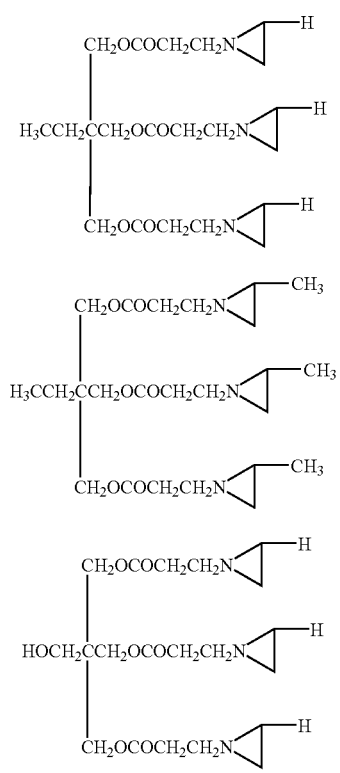

In one aspect of the present invention a cross-linking reaction of a gelable fiber induced by a basic cross-linking agent with an aziridine ring occurs by neutralization of the acid and base (redox reaction) or by the ring-opening reaction of the aziridine ring (ethyleneimine group). An example of the neutralization is reaction is formula 1, and one example of the ring-opening reaction is reaction formula 2. Wherein a basic cross-linking agent with an aziridine ring, is TAZM, a gelable fiber is methacrylic acid methyl-acrylic acid copolymer (MMA-AAco) (in formula 1, $R_1$ is $CH_3$, $X_1$ (gelable functional group) is $COOCH_3$, and $Y_1$ (acidic group) is COOH).

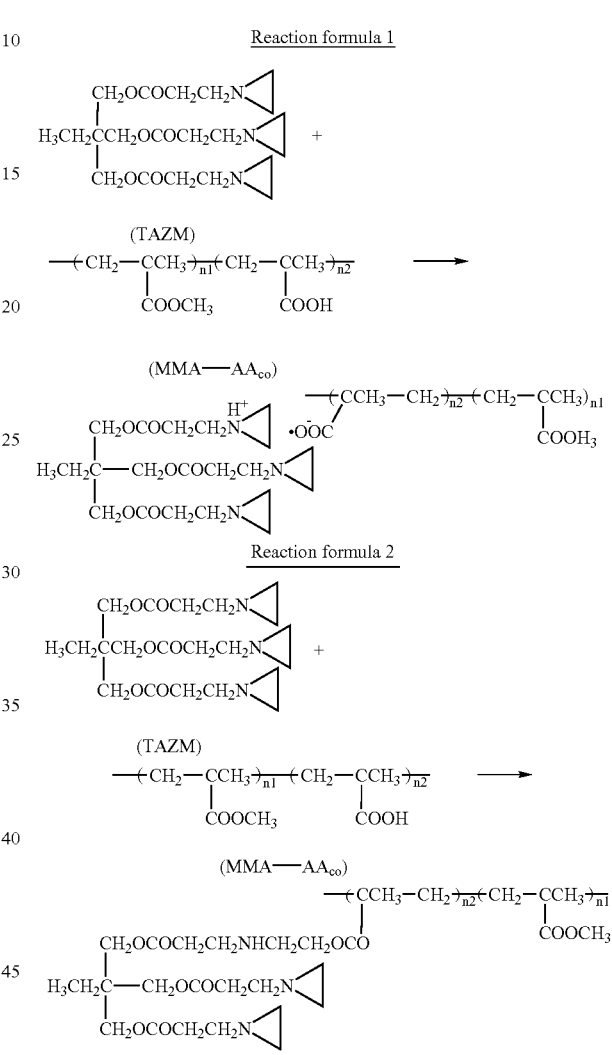

where, the TAZM has three aziridine rings with N, and the three aziridine rings have basicity, the MMA-AAco is a compound in which many $CH_3$ groups, $COOCH_3$ groups, and COOH groups having acidity are bonded to a main chain of polymethylene, the TAZM and MMA-AAco have many basic groups and acidic groups, and the acidic groups react with the basic groups to form a network with a three-dimensional structure, as shown in FIG. 1.

In one aspect of the invention, the organic electrolyte solution is prepared by dissolving lithium salts in a non-aqueous solvent, wherein the organic solvent dissolves the gelable functional group to gelate the gelable fiber and to retain itself in the composite fiber, and the basic cross-linking agent with an aziridine ring is coordinated with lithium in the organic electrolyte solution to effect the gelation. Furthermore, the organic electrolyte solution retains the composite fiber.

The non-aqueous solvent may be selected from the group consisting of propylene carbonate, ethylenecarbonate, butylenecarbonate, benzonitrile, acetonitrile, tetrahydrofuran, 2-methyltetrahydrofuran, y-butyrolactone, dioxolane, 4-methyldioxolane, N,N-dimethylformamide, sulforane, dichloroethane, chlorobenzene, nitrobenzene, dimethylcarbonate, methylethylcarbonate, diethylcarbonate, methylpropylcarbonate, methylisopropylcarbonate, ethylbutylcarbonate, dipropylcarbonate, diisopropylcarbonate, dibutylcarbonate, diethyleneglycol, dimethylether, and a mixture thereof. The non-aqueous solvent in another aspect includes at least one propylene carbonate, one ethylene carbonate, one butylene carbonate, and at least one dimethyl carbonate, one methylethyl carbonate and one diethyl carbonate.

The lithium salt may be selected from the group consisting of $LiPF_6$, $LiBF_4$, $LiSbF_6$, $LiAsF_6$, LiClO4, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, LiI, and a mixture thereof. The preferred lithium salt is selected from the group consisting of $LiPF_6$, and $LiBF_4$.

The organic electrolyte solution is not limited to the organic solvent and the lithium salt, and any organic electrolyte solution known in the related art may be used.

In one aspect of the present invention, the ungelable fiber is between about 10 to about 99 wt %, based on the total weight of the gelable fiber and the ungelable fiber. The gelable fiber is on the other hand between about 1 to about 90 wt %, based on the total weight of the gelable fiber and the ungelable fiber.

In one aspect the ratio of the gelable fiber to the organic electrolyte solution is preferably between about 1:99 to about 30:70 in weight ratio. If the ratio of the organic electrolyte solution is less than the above ratio, the ionic conductivity decreases. If the ratio of the organic electrolyte solution is more than the value prescribed above, the polymer electrolyte fluidity decreases.

The ratio of the basic cross-linking agent and the organic electrolyte solution in one aspect of the present invention is preferably between about 0.5 to about 50 wt %, wherein the gelable fiber is swelled by the organic electrolyte solution to effect gelation, thus integrating the organic electrolyte solution into the composite fiber.

The acidic group is crosslinked by the basic cross-linking agent and maintains maintaining the structure of the composite fiber so that it is difficult to separate the gelation portion from the composite fiber, wherein the cross-linking reaction depends on the redox reaction such that the reaction can be completed and the sufficient cross-linking structure can occur.

The acidic group in the gelable fiber reacts with the basic cross-linking agent to form a rigid cross-linking structure enabling no breakage at high temperatures, wherein a rigid structure allows sufficient retention of the organic electrolyte solution, which in turn results in a good heat-resistant polymer electrolyte.

In a different embodiment of the present invention, the polymer electrolyte comprises a composite fiber having basic groups, wherein the composite fiber further comprises a gelable fiber and an ungelable fiber, and an acidic cross-linking agent, immersed with an organic electrolyte solution.

The ungelable fiber may be selected from the group consisting of a polypropylene fiber, a polyethylene fiber, a polyethyleneterephthalate fiber, a polystyrene fiber, nylon, cellulose, and a mixture thereof. The ungelable fiber is preferably a polypropylene fiber or a polyethylene fiber. Furthermore, any material that is not gelated or is difficult to gelate may be used.

An example of a gelable fiber is a compound represented by formula 9.

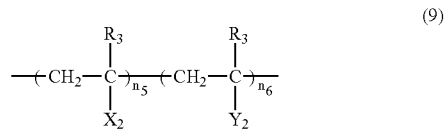

wherein
two $R_3$ groups are the same or independently H or $CH_3$,
$X_2$ is a gelable functional group, and it is $COOCH_3$ or CN,
$Y_2$ is a basic group, and it is $C_5H_4N$ or $C_{m1}H_{2m1}(CH_3)_2$ (where 0 $m_1$ 10),
$n_5$ and $n_6$ are the degree of polymerization,
$n_5$ is 100 to 10000, and
$n_6$ is 10 to 1000.

If the degree of polymerization (values of $n_5$ and $n_6$) is less than the range prescribed above, the fluidity of the polymer electrolyte will increase and the polymer electrolyte will not solidify. If the degree of polymerization (values of $n_5$ and $n_6$) is more than the range prescribed above, the macro molecular weight polymer will not gelate by the organic electrolyte solution.

The polymer of formula 9 is a random polymer in which the repeating units respectively with $n_5$ and $n_6$ are randomly arranged in the polymer back bone.

The acidic cross-linking agent is a compound selected from the group consisting of the compounds represented by formula A, formula B, formula C, formula D, formula E, formula F, or a mixture thereof.

  (A)

  (B)

  (C)

  (D)

  (E)

  (F)

(wherein $0 \leq m_2 \leq 50$, $1 \leq m_3 \leq 50$, $0 \leq m_4 \leq 50$, and $1 \leq m_5 \leq 50$)

In another aspect of the invention, the acidic cross-linking agent has two COOH groups (carboxyl group) or two $SO_3H$ groups (sulfuric acid group), and the acidic cross-linking agent is a binary acid. Furthermore, if the range of $m_2$, $m_3$, $m_4$ and $m_5$ is less than the above range, it is difficult to form the complex. On the other hand if the range of $m_2$, $m_3$, $m_4$ and $m_5$ is more than the above range, the complex becomes too solid and it is difficult to gelate with the organic electrolyte solution.

An example of a cross-linking reaction of a gelable fiber by an acidic cross-linking agent is the neutralization of the acid and the base, wherein the cross-linking reaction of the gelable fiber by the acidic cross-linking agent may be illustrated by $C_5H_4N$ or $C_{m2}H_{2m1}N(CH_3)_2$ basic group reacting with COOH (carboxylic group) or $SO_3H$ (sulfuric acid group) to form a complex.

Furthermore, the gelable fiber and the acidic cross-linking agent have many basic groups and acidic groups that react with one another to generate a two or a three-dimensional complex.

The organic electrolyte solution is, in one aspect a lithium salt dissolved in the non-aqueous solvent using the non-aqueous solvent and lithium salts as discussed above. The organic solvent dissolves the gelable functional group to gelate the gelable fiber and to retain itself in the composite fiber.

In one aspect of the present invention the ratio between the ungelable fiber and the total weight of the ungelable fiber and the gelable fiber is between about 10 to about 99 wt %, and the ratio of the gelable fiber and the total weight of the ungelable fiber and the gelable fiber is about 1 to about 90 wt %.

The weight ratio of the gelable fiber to the organic electrolyte solution in another aspect of the invention is 1:99 to 30:70. If the ratio of the gelable fiber to the organic electrolyte solution is less than the above range, the ionic conductivity decreases. If the ratio of the gelable fiber to the organic electrolyte solution is more than the above range, the fluidity of the polymer electrolyte increases.

In another aspect, the weight ratio of the acidic cross-linking agent is in the range of about 0.5 to about 50 wt % of the organic electrolyte solution.

In another embodiment, the gelable fiber swells by the organic electrolyte solution and affects gelation such that the organic electrolyte solution integrates into the composite fiber.

The basic group crosslinked by the acidic cross-linking agent, in one aspect of the present invention, helps to maintain the structure of the composite fiber so that it is difficult to separate the gelation portion from the composite fiber.

The cross-linking reaction depends on the redox reaction such that the reaction can be completed and a sufficient cross-linking structure can generate.

The acidic group in the gelable fiber reacts with the acidic cross-linking agent to form a rigid cross-linking structure enabling no breakage at high temperatures. Such a rigid structure allows sufficient retention of organic electrolyte solution, which results in a good heat-resistant polymer electrolyte.

In another embodiment of the present invention a rechargeable lithium battery having a polymer electrolyte comprises an electrode element with the polymer electrolyte as described above, a positive electrode, a negative electrode, and a case.

In one aspect of the present invention, the electrode element is manufactured by interposing the polymer electrolyte between the positive electrode and the negative electrode, and winding the resulting structure to integrate the components, wherein the electrode element has a length of 62 mm, a width of 35 mm, and a thickness of 3.5 mm.

The active materials in the positive electrode and the negative electrode use compounds that intercalate and deintercalate lithium ions. The positive active material is selected from the group consisting of $LiMn_2O_4$, $LiCoO_2$, $LiNiO_2$, $LiFeO_2$, $V_2O_5$, $TiS$, $MoS$, an organic disulfide compound, an organic polysulfide compound, and a mixture thereof. The negative active material is selected from the group consisting of artificial graphite, natural graphite, graphitized carbon fiber, amorphous carbon, lithium metal, and a mixture thereof. However, it is understood that other active materials may be used or developed.

The positive and negative electrodes, in one aspect of the invention, are produced by forming an active mass in the form of a pellet, or by coating a paste composition on a current collector such as a metal sheet or a metal mesh. Furthermore, positive and negative electrodes known in the related art may be used.

In one aspect of the present invention, the polymer electrolyte acts as an electrolyte for lithium ions and as a separator for separating the positive electrode and the negative electrode. Thus, an additional separator is not required. However, a conventional separator is also used in the rechargeable lithium battery according to an embodiment of the present invention.

The polymer electrolyte of the present invention does change from a solid to a liquid, and it can provide a rechargeable lithium battery exhibiting good stability and good cycle characteristics.

The polymer electrolyte of the present invention can be applicable to a coin-type battery.

In another embodiment of the present invention shown in FIGS. 3A through 3E, a method of preparing a rechargeable lithium battery includes mixing a gelable fiber and an ungelable fiber together to prepare a composite fiber as a base polymer. The gelable fiber has at least two acidic or basic groups, and at least two gelable functional groups. The gelable fiber is gelated by a non-aqueous solvent, and the ungelable fiber is not gelated by a non-aqueous solvent. The gelable fiber is preferably uniformly mixed with the ungelable fiber. The mixing process to prepare the composite fiber may employ the various conventional processes.

In one aspect of the present invention, the gelable fiber and the ungelable fiber may use thermoplastic polymers. The individual fibers or pulp of the gelable fiber are mixed with the individual fibers or pulp of the ungelable fiber, and the mixture of the pulp of the gelable fiber and the pulp of the ungelable fiber is heat-melted to make a non-woven type or a paper-type sheet.

In one aspect of the invention, a knit, woven, or non-woven sheet of the ungelable fiber is twisted with the gelable fiber. For example, the single fiber sheet of the gelable fiber is deposited on one or both sides of the ungelable fiber, and they are twisted by using a needle punch or with an air or water stream. The composite of the ungelable fiber and the gelable fiber is formed as a woven-type or knit-type composite. Alternatively, the sheet of the ungelable fiber is prepared by a wet procedure and the thermoplastic gelable fiber is melted on the sheet.

In one aspect of the present invention, the base polymer 22 is interposed between the positive electrode 20 and the negative electrode 21 to make an electrode element 23 (operation 6). The electrode element is inserted into a battery case 24. The basic or acidic cross-linking agent is mixed with the organic electrolyte solution to prepare a gelation solution G (operation 7). The gelation solution G is added to the electrode element 23 in the battery case 24 (operation 8). The battery case 23 is sealed with a sealing plate 25 (operation 9).

The battery case 23 is heat-treated in operation 10. The base polymer 22 is then cross-linked by the basic cross-linking agent in the gelation solution and is gelated by the organic electrolyte solution to prepare a polymer electrolyte E. As a result, a rechargeable lithium battery 26 is obtained.

The heat-treatment is preferably performed at 40 to 85° C. for 5 to 600 minutes, in one aspect of the present invention. According to the type of the base polymer and the cross-linking agent, the heat-treatment may be omitted.

During the manufacturing process of the rechargeable lithium battery, in one aspect of the present invention, the base polymer is cross-linked after it is inserted into the battery case, the polymer electrolyte is prepared in the battery case, rendering a simple overall procedure and improved productivity.

Furthermore, the process above does not require a polymerization initiator, therefore the problems associated with a product derived from the initiator such as the deterioration of the charge and discharge characteristics and the generation of gas, do not occur.

In another aspect an acidic polymer and a basic compound may be used.

Hereinafter, specific examples are provided to assist in the understanding of the present invention. These following examples, however, are only for the purpose of facilitating understanding of the invention and should not be construed to be limiting in any sense.

EXAMPLE 1

(1) Preparation of Non-Woven Fiber

To prepare a gelable fiber, a fiber A made of a copolymer of 2 wt % of acrylic acid, 10 wt % of methacrylate and 88 wt % of acrylnitrile, and having a diameter $\phi$ of 7 μm and a length of 4 mm, was prepared. To prepare an ungelable fiber, a fiber B made of a separating fiber of 50 wt % of polypropylene and 50 wt % of polyethylene, and having a diameter $\phi$ of 10 μm and a length of 4 mm, was prepared. The fiber A was mixed with the fiber B in the mixing ratio of 10:90 wt %, and the mixture was heat-melted to make a non-woven fiber. The non-woven fiber was separated by a water stream, and the thickness thereof was controlled to 50 μm with a roll press to prepare a composite fiber.

(2) Preparation of Gelation Solution

A mixed solution of ethylene carbonate and diethylcarbonate (3:7) in which 1.3M LiPF$_6$ was dissolved was used as an organic electrolyte solution. TAZM as a basic cross-linking agent was mixed with the organic electrolyte solution in the weight ratio of 5:95 to prepare a gelation solution.

(3) Fabricating a Spiral-Type Lithium Cell

Figure 2:
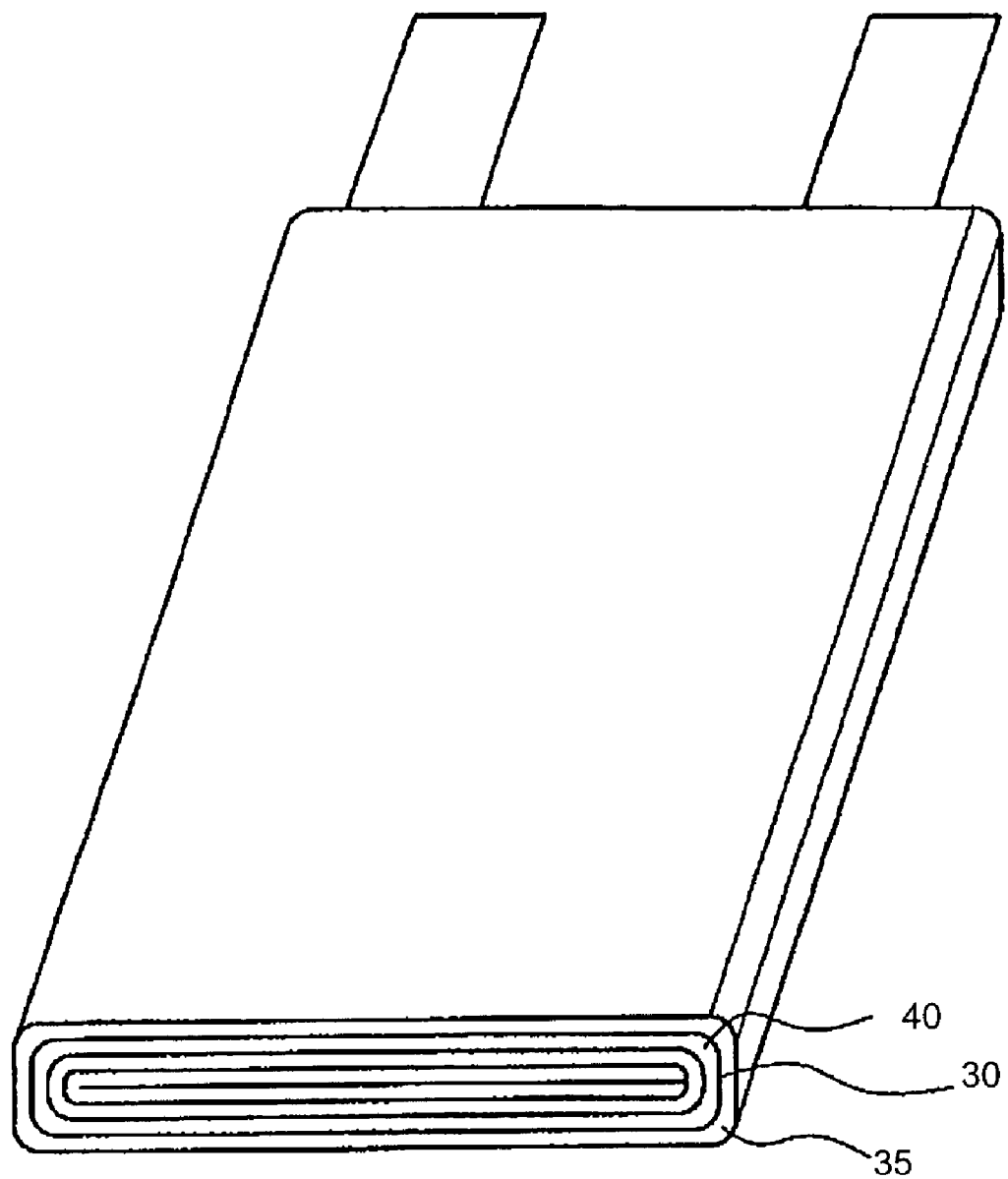
FIG. 2 is a perspective diagram showing a rechargeable lithium battery according to an embodiment of the present invention.
Figure 3A:
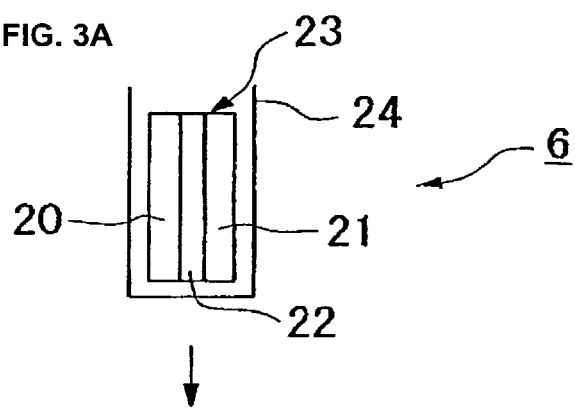
FIGS. 3A through 3E illustrate a procedure diagram showing polymer electrolyte preparation in an embodiment of the present invention.
Figure 3E:
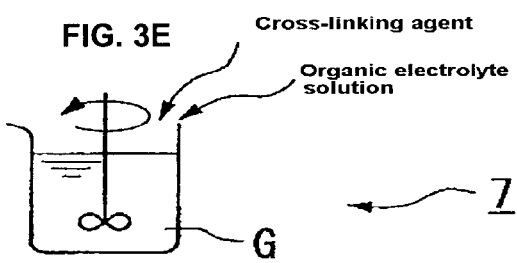
Figure 3B:
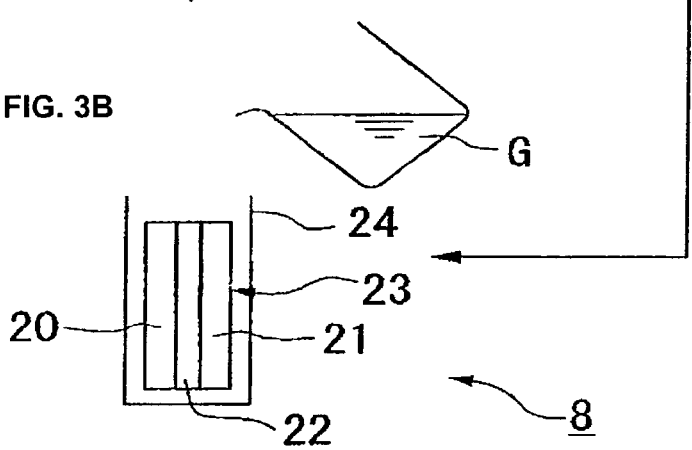
Figure 3C:
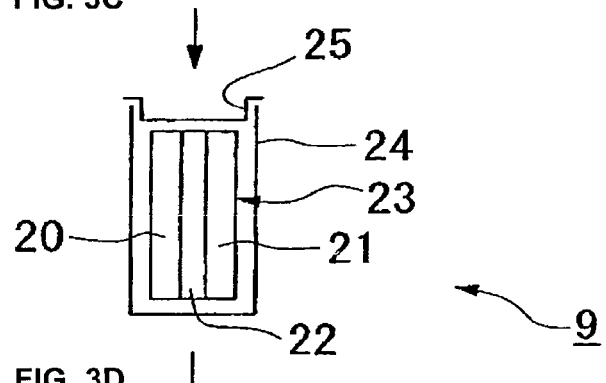
Figure 3D:
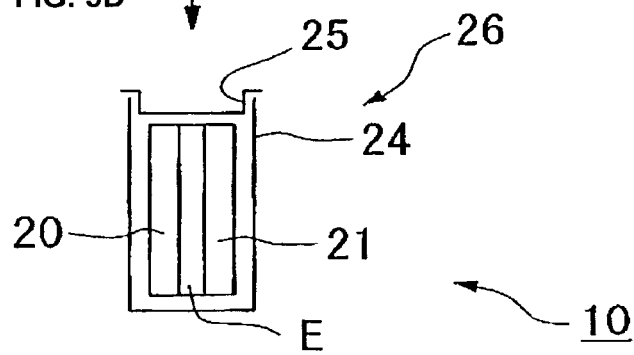

The composite fiber was introduced between a positive electrode and a negative electrode, and they were spirally wound to fabricate an electrode element as shown in FIG. 2. The positive electrode used LiCoO$_2$ as a positive active material, and the negative electrode used carbon. The electrode element was inserted into an Al-laminate case, 3.0 g of the gelation solution was injected into the case, and it was sealed. The sealed case was allowed to stand at 75° C. for 24 hours to effect gelation and the cross-linking reaction. As a result, a spiral-type lithium cell with a capacity of 600 mAh was fabricated.

(4) Fabricating a Coin-Type Lithium Cell

A positive electrode with LiCoO$_2$ as an active material, the composite fiber, and a packing were arranged in a coin-type battery case. 60 μg of the gelation solution was injected into the case, and a negative electrode with carbon as an active material and a negative cover were placed thereon and the battery case was sealed. The battery case was allowed to stand at 75° C. for 24 hours to effect gelation and the cross-linking reaction. As a result, a coin-type lithium cell with a capacity of 5 mAh and having a diameter of 20 mm and a length of 1.6 mm (CR2016 size) was fabricated.

EXAMPLE 2

A spiral-type cell and a coin-type lithium cell were fabricated by the same procedure as in Example 1, except that the fiber A was mixed with the fiber B in the weight ratio of 20:80.

EXAMPLE 3

A spiral-type cell and a coin-type lithium cell were fabricated by the same procedure as in Example 1, except that the basic cross-linking agent was prepared by mixing TAZO and a compound of formula 3 with R$_2$ being H in the weight ratio 25:75, and the basic cross-linking agent was mixed with an organic electrolyte solution in the weight ratio of 3:97 to prepare a gelation solution.

EXAMPLE 4

A spiral-type cell or a coin-type lithium cell were fabricated by the same procedure as in Example 1, except that the fiber A was mixed with the fiber B in the weight ratio of 20:80 to prepare a composite fiber.

Comparative Example 1

(1) Preparation of Non-Woven Fiber

To prepare a gelable fiber, a fiber A' made of a copolymer of 10 wt % of methacrylate and 90 wt % of acrylnitrile and having a diameter $\phi$ of 7 μm and a length of 4 mm, was prepared. To prepare a non-gelation fiber, a fiber B' made of a separating fiber of 50 wt % of polypropylene and 50 wt % of polyethylene, and having a diameter $\phi$ of 10 μm and a length of 4 mm, was prepared. The fiber A' was mixed with the fiber B' in the mixing ratio of 10:90 wt %, and the mixture was heat-melted to make a non-woven fiber. The non-woven fiber was separated by a water stream, and the thickness thereof was controlled to 50 μm with a roll press to prepare a composite fiber.

(2) Preparation of Organic Electrolyte Solution

A mixed solution of ethylene carbonate and diethylcarbonate (3:7) in which 1.3M LiPF$_6$ was dissolved was used as an organic electrolyte solution.

(3) Fabricating a Spiral-Type Lithium Cell

The composite fiber for the polymer electrolyte 30 was introduced between a positive electrode 35 and a negative electrode 40 and the resulting structure was spirally wound to fabricate an electrode element as shown in FIG. 2. The positive electrode 35 used LiCoO$_2$ as an positive active material, and the negative electrode 40 used carbon.

The electrode element was inserted into an Al-laminate case, 3.0 g of the organic electrolyte solution was injected into the case, and it was sealed. The sealed case was allowed to stand at 75° C. for 24 hours to effect gelation and the cross-linking reaction. As a result, a spiral-type lithium cell with a capacity of 600 mAh was fabricated.

(4) Fabricating a Coin-Type Lithium Cell

A positive electrode with LiCoO2 as an active material, the composite fiber, and a packing were arranged in a coin-type battery case. 60 μg of the organic electrolyte solution was injected into the case, and a negative electrode with carbon as an active material and a negative cover were placed thereon and the battery case was sealed. The battery case was allowed to stand at 75° C. for 24 hours to effect gelation and the cross-linking reaction. As a result, a coin-type lithium cell with a capacity of 5 mAh and having a diameter of 20 mm and a length of 1.6 mm (CR2016 size) was fabricated.

Comparative Example 2

A spiral-type cell and a coin-type cell were fabricated by the same procedure as in Comparative Example 1, except that the fiber A' is mixed with the fiber B' in the weight ratio of 20:80 to prepare a composite fiber.

Experiment 1

The spiral-type lithium cells according to Examples 1 to 4 and Comparative Examples 1 and 2 were heated at 85° C. for 1 hour, and then allowed to stand at room temperature for 5 minutes. The end portions of the Al-laminate case of cells were cut. Thereafter, the resulting cells were compressed at a pressure of 4 kgf (about 392N) for 10 seconds. The cells according to Example 1 to 4 did not leak electrolyte solution, but those according to Comparative Examples 1 and 2 did leak the electrolyte solution. Thus, the polymer electrolyte of the present invention has good resistance to leakage.

Experiment 2

Figure 4:
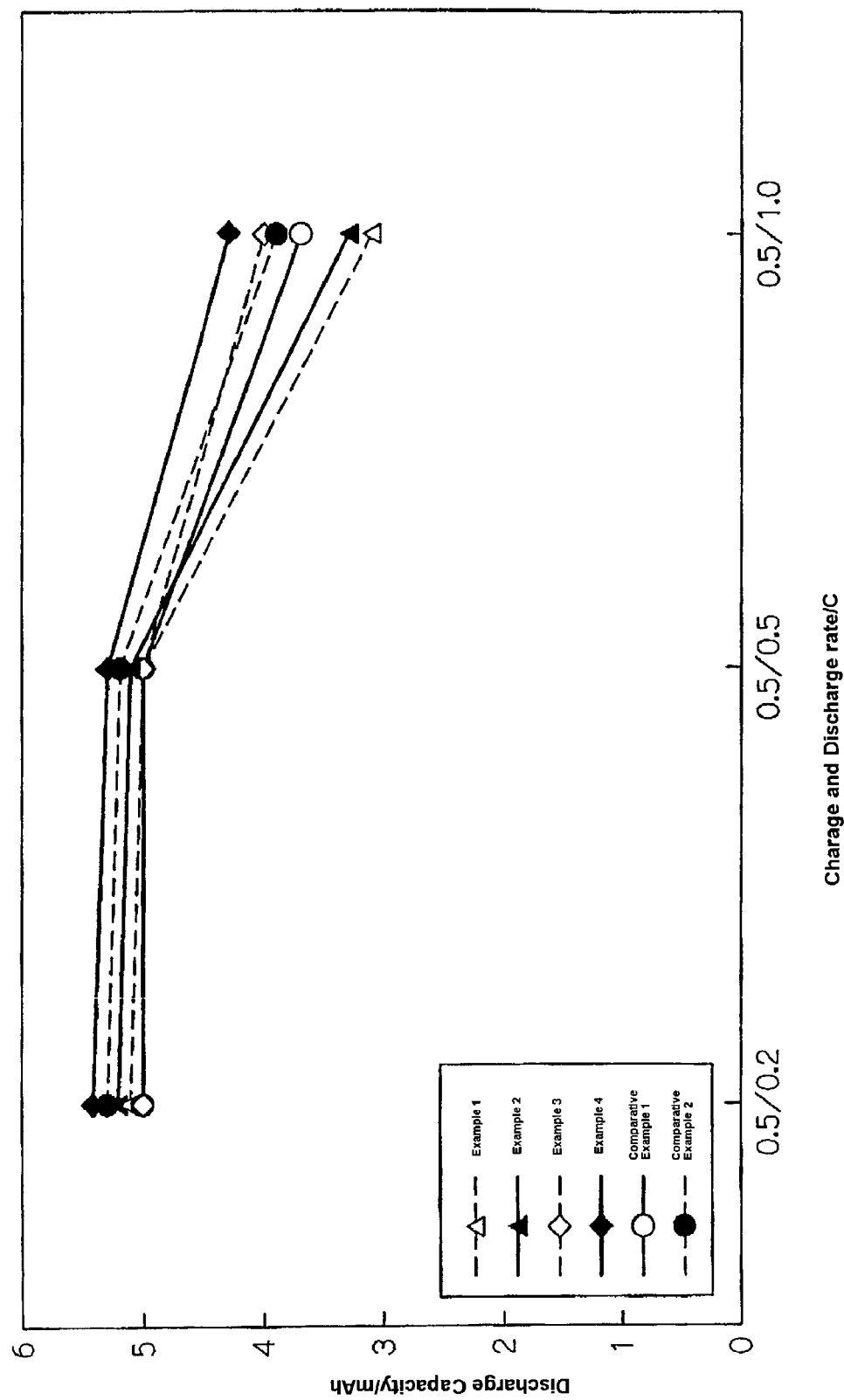
FIG. 4 is a graph illustrating charge and discharge characteristics of a rechargeable lithium battery according to an embodiment of the present invention.

The coin-type lithium cells according to Examples 1 to 4 and Comparative Examples 1 and 2 were charged at a constant current at a predetermined voltage, and then discharged at a constant current. At this time, the coin-type lithium cell was charged at constant current corresponding to 0.5 C The charge was stopped at 4.2V. The charging was switched from a constant current mode to a constant voltage mode at 4.2V for 9 hours. The discharging was performed at 0.2 C, 0.5 C or 1.0 C at a constant current. The discharge was stopped at 2.75V. These results are shown in FIG. 4, where it can be seen that all cells exhibited similar charge and discharge characteristics. Thus, the polymer electrolyte of the present invention does not deteriorate the battery performance.

According to the present invention, the gelable fiber is swelled by the organic electrolyte solution to affect gelation, thereby integrating the organic electrolyte solution into the composite fiber. Further, the acidic group or basic group crosslinked by the basic or acidic cross-linking agent helps to maintain the structure of the composite fiber so that it is difficult to separate the gelation portion from the composite fiber. Also, the cross-linking reaction depends on the redox reaction such that the reaction can be completed and a sufficient cross-linking structure can generate. Additionally, the acidic group or the basic group in the gelable fiber reacts with the basic or acidic cross-linking agent to form a rigid cross-linking structure enabling no breakage at high temperatures. Such a rigid structure allows sufficient retention of the organic electrolyte solution, which results in a good heat-resistant polymer electrolyte.

While the present invention has been described in detail with reference to the preferred embodiments, those skilled in the art will appreciate that various modifications and substitutions can be made thereto without departing from the spirit and scope of the present invention as set forth in the accompanying claims and equivalents thereof.

What is claimed is:

1. A polymer electrolyte for a rechargeable lithium battery, comprising:
an organic electrolyte solution having a lithium salt dissolved in a non-aqueous solvent; and
a composite fiber immersed with the organic electrolyte solution, the composite fiber comprising:
a gelable fiber that is gelated by the non-aqueous solvent, is cross-linked by a bivalent or multivalent basic cross-linking agent, and is gelated by the organic electrolyte solution, and
an ungelable fiber that is not gelated by the non-aqueous solvent, wherein the gelable fiber has at least two acidic groups and at least two gelable functional groups.

2. The polymer electrolyte of claim 1, wherein the acidic group is selected from the group consisting of a carboxylic group and a sulfuric group.

3. The polymer electrolyte of claim 1, wherein the gelable functional group is a cyano group and/or a methoxycarbonyl group.

4. The polymer electrolyte of claim 1, wherein the basic cross-linking agent includes a compound including one aziridine ring.

5. The polymer electrolyte of claim 4, wherein:
the basic cross-linking agent is selected from the group consisting of compounds having formulas 2 and 3,

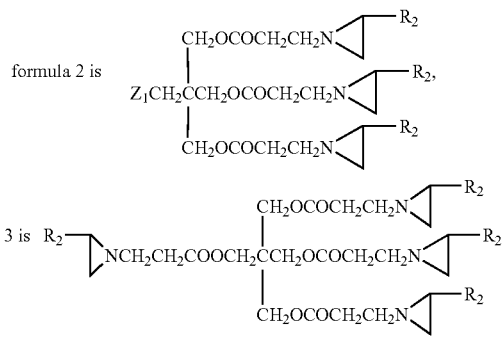

$R_2$ is two functional groups that are the same or independently H or $CH_3$, and
$Z_1$ is one of three functional groups that are the same or independently H, $CH_3$ and OH.

6. The polymer electrolyte of claim 1, wherein the gelable fiber is represented by formula 1,

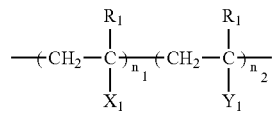

wherein two $R_1$ groups are the same or independently H or $CH_3$,
$X_1$ is $COOCH_3$ or CN and is a gelable functional group,
$Y_1$ is COOH or $SO_3H$, and $Y_1$ is an acidic group,
$n_1$ and $n_2$ are polymerization degrees, wherein $n_1$ is in the range of about 100 to about 10,000, and $n_2$ is in the range of about 10 to 10,000.

7. The polymer electrolyte of claim 1, wherein the ungelable fiber is selected from the group consisting of polypropylene, polyethylene, polyethyleneterephthalate, polystyrene, nylon, cellulose, and a mixture thereof.

8. A polymer electrolyte comprising:
an organic electrolyte solution having a lithium salt dissolved in an non-aqueous solvent, and a composite fiber immersed with the organic electrolyte solution, the composite fiber comprising:
a gelable fiber that is gelated by the non-aqueous solvent and is gelated by the organic electrolyte solution, and
an ungelable fiber that is not gelated by the non-aqueous solvent, wherein the gelable fiber comprises at least two basic functional groups and at least two gelable functional groups, and
the composite fiber is cross-linked by a bivalent or multivalent acidic cross-linking agent.

9. The polymer electrolyte of claim 8, wherein the basic functional group is selected from the group consisting of a pyridyl group and a dimethylamino group.

10. The polymer electrolyte of claim 8, wherein the acidic cross-linking agent is a compound selected from the group consisting of compounds represented by formulas A through F, and a mixture thereof,

  (A)

  (B)

  (C)

  (D)

  (E)

  (F)

wherein $0 \leq m_2 \leq 50$, $1 \leq m_3 \leq 50$, $0 \leq m_4 \leq 50$, and $1 \leq m_5 \leq 50$.

11. The polymer electrolyte of claim 8, wherein the gelable functional group is selected from the group consisting of a cyano group and a methoxycarbonyl group.

12. The polymer electrolyte of claim 8, wherein the gelable fiber is represented by formula 1,

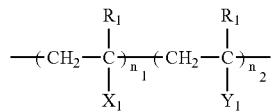

wherein two $R_1$ groups are the same or independently h or $CH_3$,
$X_1$ is $COOCH_3$ or CN and is a gelable functional group,
$Y_1$ is COOH or $SO_3H$, and is an acidic group, and
$n_1$ and $n_2$ are polymerization degrees, wherein $n_1$ is in the range of about 100 to about 10,000, and $n_2$ is in the range of 10 to 10,000).

13. The polymer electrolyte of claim 8 wherein the ungelable-fiber is selected from the group consisting of polypropylene, polyethylene, polyethylenetterephthalate, polystyrene, nylon, cellulose, and a mixture thereof.

14. A rechargeable lithium battery comprising:
a positive electrode that intercalates and deintercalates lithium ions;
a negative electrode that intercalates and deintercalates lithium ions;
a polymer electrolyte, disposed between the positive and negative electrodes, the polymer electrolyte comprising
an organic electrolyte solution having a lithium salt dissolved in a non-aqueous solvent, and
a composite fiber immersed with the organic electrolyte solution, the composite fiber comprising
a gelable fiber that includes at least two acidic groups and at least two gelable functional groups, is gelated by the non-aqueous solvent, is cross-linked by a bivalent or multivalent basic cross-linking agent, and is gelated by the organic electrolyte solution, and
an ungelable fiber that is not gelated by the non-aqueous solvent.

15. A method of manufacturing a rechargeable lithium battery, comprising: preparing a base polymer by making a composite fiber including a gelable fiber that has at least two acidic groups and at least two gelable functional groups, and is capable of being gelated by a non-aqueous solvent, and an ungelable fiber that is not capable of being gelated by a non-aqueous solvent;
preparing a gelating liquid by mixing a bivalent or multivalent basic cross-linking agent that cross-links the gelable fiber with an organic electrolyte solution that includes lithium salts dissolved in a non-aqueous solvent;
inserting into a battery case a positive electrode and a negative electrode that are intercalate and deintercalate lithium ions, with the base polymer, the base polymer being disposed between the positive and negative electrodes; and
adding the gelating liquid into the battery case.

16. The method of claim 15, further comprising heating the battery case at 40 to 85° C. for 10 to 600 minutes after inserting a positive and a negative electrode into the battery case.

17. A method of manufacturing a rechargeable lithium battery comprising:
preparing a base polymer by making a composite fiber with a gelable fiber that has at least two acidic groups and at least two gelable functional groups, and is gelated by a non-aqueous solvent, and an ungelable fiber that is not gelated by a non-aqueous solvent to prepare a base polymer;
preparing a gelating liquid by mixing a bivalent or multivalent acidic cross-linking agent that cross-links the gelable fiber, with an organic electrolyte solution that includes lithium salts dissolved in a non-aqueous solvent;
inserting into a battery case the positive electrode and the negative electrode that intercalate and deintercalate lithium ions, and the base polymer, the base polymer being disposed between the positive and negative electrodes and adding the gelating liquid into the battery case.

18. The method of claim 17 further comprising heating the battery case at 40 to 85° C. for 10 to 600 minutes after inserting the positive and negative electrodes and the base polymer into the battery case.

19. The polymer electrolyte of claim 6, wherein $n_2$ is in the range of about 10 to about 1,000.

20. The polymer electrolyte of claim 12, wherein $n_2$ is in the range of about 10 to about 1,000.

21. The polymer electrolyte of claim 4, wherein the basic cross-linking agent is selected from the group consisting of compounds having formulas 4 and 5, where formula 4 is

-continued formula 5 is 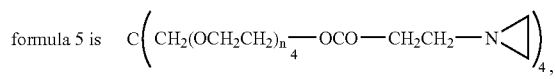

$n_3$ is in the range of about 0 to about 10, and $n_4$ is in the range of about 0 to about 10.

22. The polymer electrolyte of claim 4, wherein the basic cross-linking agent is selected from the group consisting of trimethylolpropane-tris(2-methyl-(1-aziridinepropionate) and N,N-hexamethylene-1,6-bis(1-aziridinecarboxyamide).

23. The polymer electrolyte of claim 1, wherein an amount of the ungelabe fiber is at or between about 10 and about 99 wt %, based on the total weight of the gelable fiber and the ungelable fiber.

24. The polymer electrolyte of claim 1, wherein an amount of the gelable fiber at or between about 1 and about 90 wt %, based on the total weight of the gelable fiber and the ungelable fiber.

25. The polymer electrolyte of claim 1, wherein a ratio of the gelable fiber to the organic electrolyte solution is at or between about 1:99 and about 30:70.

26. The polymer electrolyte of claim 1, wherein a ratio of the basic cross-linking agent and the organic electrolyte solution is at or between about 0.5 and about 50 wt %.

27. The polymer electrolyte of claim 1, wherein a knit, woven, or non-woven sheet of the ungelable fiber is twisted with the gelable fiber.

* * * * *

UNITED STATES PATENT AND TRADEMARK OFFICE
CERTIFICATE OF CORRECTION

PATENT NO. : 7,033,705 B2
APPLICATION NO. : 10/207767
DATED : April 25, 2006
INVENTOR(S) : Takitaro Yamaguchi et al.

Page 1 of 1

It is certified that error appears in the above-identified patent and that said Letters Patent is hereby corrected as shown below:

Column 17, line 36, insert --formula 1 is--.

Column 17, line 44, change "h" to --H--.

Column 17, line 50, change "10,000)" to --10,000--.

Column 17, line 53, change "polyethylenetterephthalate" to --polyethyleneterephthalate--.

Column 18, line 8, start new paragraph after "comprising".

Signed and Sealed this

Twenty-first Day of November, 2006

JON W. DUDAS
*Director of the United States Patent and Trademark Office*